March 21, 1961  I. P. HARING  2,975,580
COTTON PICKER BARS
Filed March 26, 1958  2 Sheets-Sheet 1
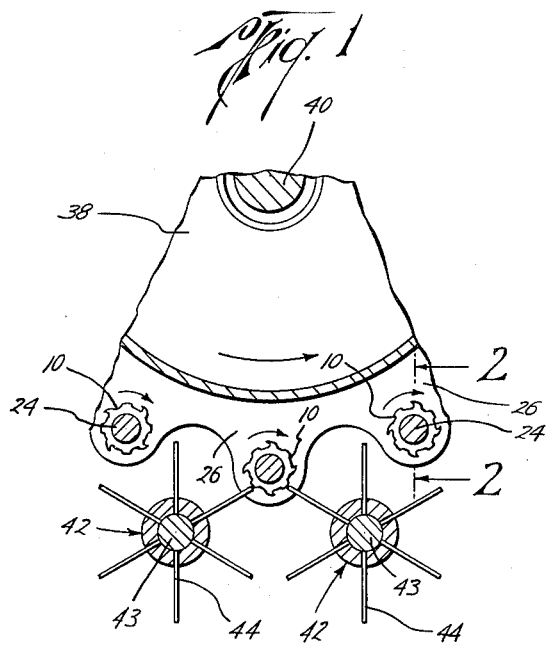
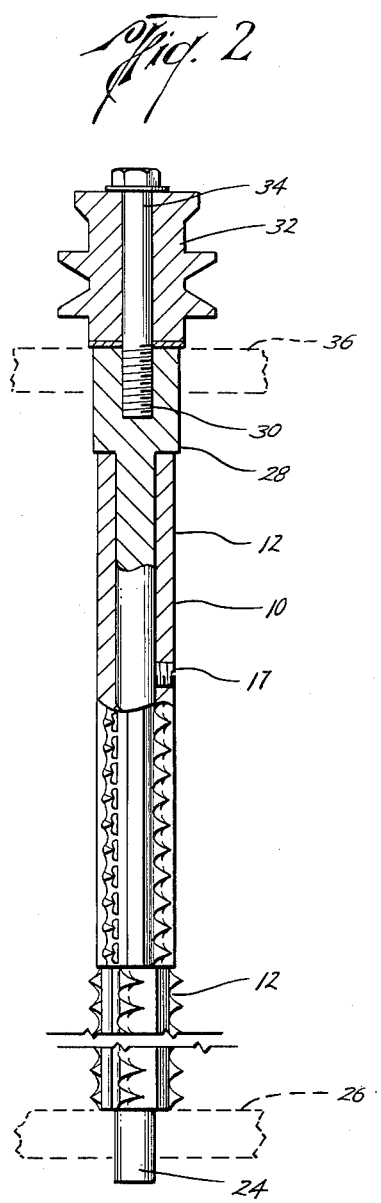
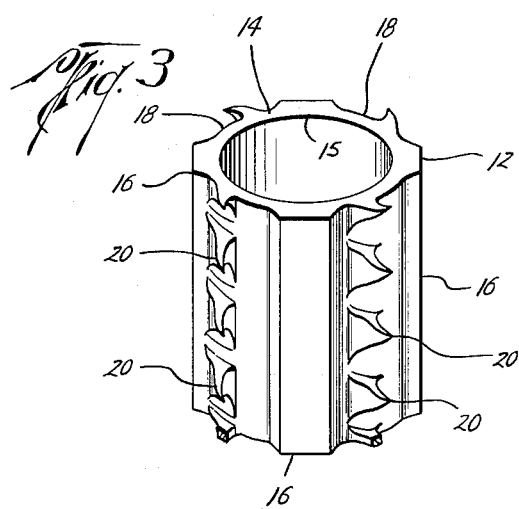
Ivan P. Haring
INVENTOR.
BY
ATTORNEYS March 21, 1961
I. P. HARING
2,975,580
COTTON PICKER BARS
Filed March 26, 1958
2 Sheets-Sheet 2
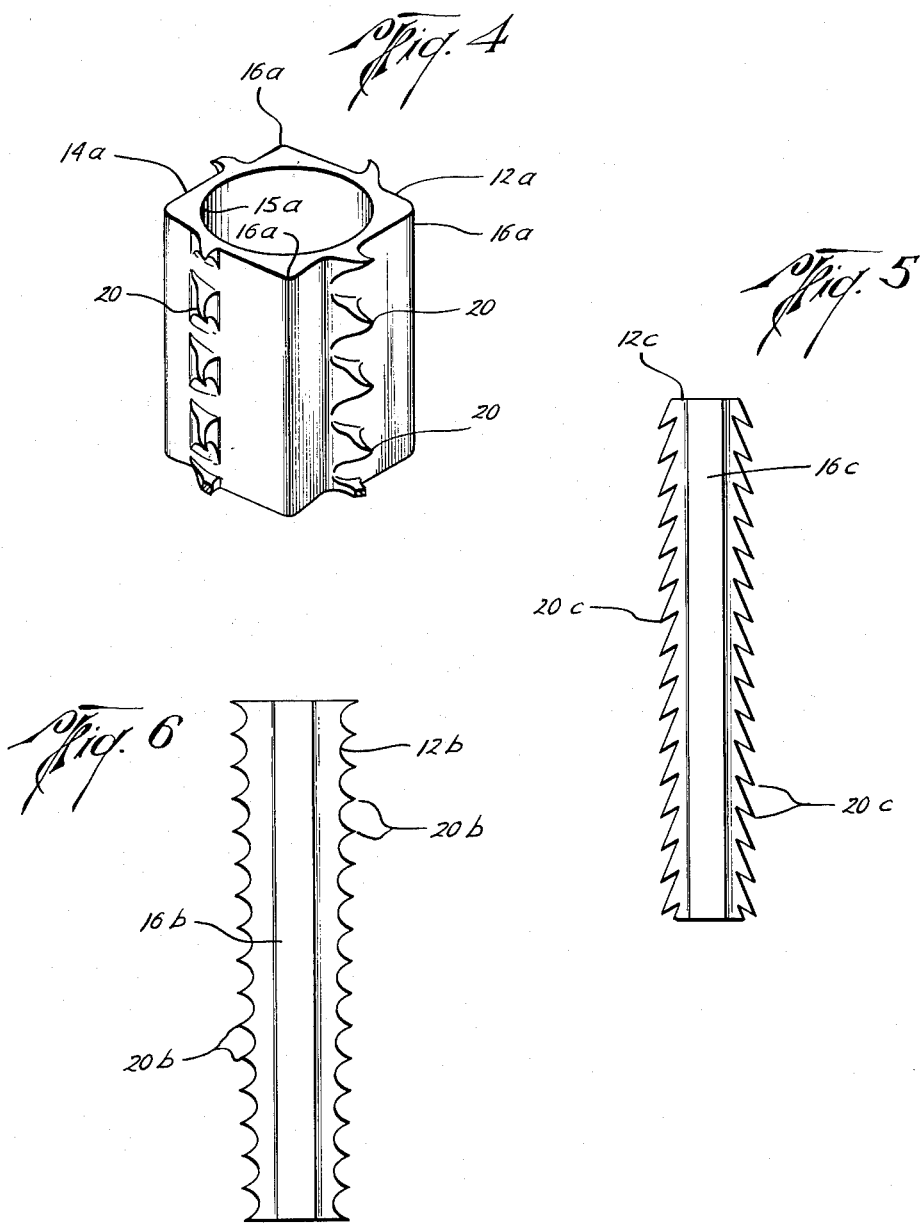
Ivan P. Haring
INVENTOR.
BY James F. Wiler
Jefferson D. Hiller &
William A. Stout
ATTORNEYS

United States Patent Office 2,975,580
Patented Mar. 21, 1961

2,975,580

COTTON PICKER BARS

Ivan P. Haring, P.O. Box 644, Crosby, Tex., assignor of twenty-five percent to E. A. Kruse, twenty-five percent to Howard T. Tellefsen, and fifteen percent to H. C. Donahoe, all of Houston, Tex.

Filed Mar. 26, 1958, Ser. No. 724,107

4 Claims. (Cl. 56—50)

The present invention relates to a picker bar and, more particularly, relates to an improvement in a cotton picker bar which prevents the cotton from balling up on the bar.

This invention is directed to an improvement in the picking elements or bars of a cotton picking machine such as disclosed in my Patent No. 2,680,314, dated June 8, 1954, and in a cotton picking unit such as disclosed in my application Ser. No. 519,129, now Patent No. 2,836,025. The picking elements or bars of the present invention, of course, may be used with other cotton picking and delinting devices.

It is therefore a general object of the present invention to provide an improved cotton picker bar which efficiently picks cotton from the bolls without damaging the cotton plants and without picking large quantities of foliage or trash.

It is a specific object of the present invention to provide such an improved cotton picker bar that keeps the cotton, and more particularly lint from green and most cotton bolls from balling up on the bar so that it may readily be doffed from the bar and no moistening device is necessary.

It is yet a further object of the present invention to provide an improved cotton picker bar which is rugged and durable in use and insures substantially complete picking of cotton from the plants including hard to pick cotton, for example, Stormproof Cotton, which is tight in the boll.

Other and further objects, features and advantages will be apparent from the following description of a presently preferred embodiment of the invention, given for the purpose of disclosure, and taken in conjunction with the accompanying drawings, where like character references designate like parts throughout the several views, and where:

Figure 1 is a fragmentary view, partly in section, illustrating the removal of cotton from bars according to the present invention by a doffer assembly, Figure 2 is an enlarged side elevation taken along line 2—2 of Figure 1, partly in section, illustrating a preferred picking bar, Figure 3 is an enlarged perspective view illustrating a section of a preferred picking bar, Figure 4 is an enlarged perspective view illustrating a modified form of a picking bar in which the ribs are modified, Figure 5 is an enlarged diagrammatic side elevation illustrating another modified form of a picking bar in which the teeth are modified, and Figure 6 is an enlarged diagrammatic side elevation illustrating a tapered modification of a picking bar.

In general, a cotton picking machine as disclosed by my previously mentioned patents includes one drum or two or more drums which are laterally spaced and staggered or arranged in tandem and which are rotatable about vertical axes. Rows of cotton plants are engaged by bars carried by the drums as the machine moves forward along the rows of cotton plants. The drum or drums are rotated so that the surfaces of the drums coming into contact with the cotton plants move in an opposite direction from the position of the cotton plants. As previously mentioned, vertical cotton picking elements or bars are carried by and arranged circumferentially about the peripheries of these drums which bars are rotatable about vertical axes independent of the drums. In the case of two or more drums, the drums may be staggered in the direction of movement of the machine or arranged in tandem, and if desired, a tensioning roll or a set of tensioning springs may yieldably be disposed opposite each drum so that as the picking elements are brought into engagement with the cotton plants, they engage and remove the lint from the bolls, the tensioning rolls yieldably pressing the cotton plants against the picking element to insure substantially complete picking, but yielding to avoid injury to the plants. The lint is picked from the bolls by the teeth of the picking elements engaging the lint and winding it about the picking elements.

The picking elements or bars are carried around to the delivery side of the drums where their rotation is reversed by reversing means thereby permitting unwinding of the picked lint from the bars. One or more doffing assemblies are provided on the delivery side of each drum to remove the picked lint from the bars and collecting means are provided to collect the doffed lint. As the bars are carried away from the delivery side of the drums, the rotation is again reversed and the picking elements are again rotated to engage and pick lint from the bolls.

In other cotton pickers, the bars are arranged generally horizontally and are moistened as they move into and out of picking engagement with the cotton bolls and include a doffer assembly to doff the picked cotton from the bars.

It is readily apparent that the picking elements or bars must be capable of picking lint from the cotton bolls and releasing it so that it may be doffed and the bars are again free of lint so that they again pick lint during the lint-picking portion of their cycle. While the bars disclosed in my previously-mentioned patent and application are satisfactory, the present bar constitutes an improvement in picking cotton and in permitting doffing of the picked cotton from the bars, particularly in certain types of cotton and green and moist cotton.

Referring now to the drawings, and particularly to Figures 2 and 3, the reference numeral 10 generally designates a cotton picker bar according to the present invention. The bar 10 may include a single section or be made up of a multiple number of sections 12. The advantage of using multiple sections is that the wear on the bar is not uniform along the bar and by using multiple sections instead of a single longer section the worn sections may be inexpensively removed and replaced as compared to the entire bar. When multiple sections 12 are used, they may be axially aligned on the shaft 24 or offset as shown in Figure 2.

As best seen in Figure 3 the bar 12 includes a body 14 having a tubular interior 15 for mounting on a rotatable bar shaft 24 and is secured to the shaft 24 by a set screw 17 (Figure 2). Of course, other shapes and means for securing the body to a rotatable shaft may be used and the bar 12 may be solid, if desired. On the outer periphery or circumference of the body 14 are provided ribs or ridges 16 which are circumferentially spaced around the outside of the body 14. Figure 3 discloses a bar having four such ribs, although any desired number may be provided. Teeth 20 are provided in the recesses 18 between the ribs or ridges 16, the teeth being vertically spaced from each other in rows which are axially spaced along the periphery of the body 14. It is noted that the teeth are generally pointed and projecting from the body at an angle thereto inclined in the direction of rotation for picking the cotton. The teeth 20 are illustrated as extending outwardly the same distance as the ribs 16; however, the teeth may extend outwardly slightly greater or less than the ribs 16. For example, in using rubber doffers, the teeth may extend a lesser distance than the ribs to avoid excessive wear and cutting of the doffers by the teeth. Then the teeth may be of the same, more or less diameter than the ribs depending upon the conditions and circumstances.

Of course various modifications of this bar may be made utilizing a rib or ridge 16 for preventing the cotton from balling up on the spindle. Figures 4, 5 and 6 illustrate modifications of the bar according to the invention, the letters "a," "b" and "c" being applied to parts corresponding to those in Figures 1–3, inclusive, for convenience of reference. Figure 4 illustrates a bar having a modified ridge 16a which may easily be formed as part of the body 14a instead of the flat-faced rib 16 of Figure 3. The picker bar 12a includes a generally square body 14a whose corners form rounded ridges 16a and is provided with axially extending rows of teeth 20 on the body 12a between adjacent ribs 16a. Figure 5 diagrammatically illustrates another bar having modified teeth and Figure 6 diagrammatically illustrates still another form in which the body of the bar is tapered. Figure 5 diagrammatically illustrates in side elevation a picker bar 12c similar to that of Figure 4 in which the pointed teeth 20c are pointed downwardly instead of in the direction of rotation and Figure 6 diagrammatically illustrates a side elevational view similar to Figure 4 in which the picker 12b is tapered downwardly to form a tapered spindle. Of course, any form of the bar may be tapered. The tapered bars are particularly adapted for use with those pickers having generally horizontally-extending bars or picking elements. No further description is deemed necessary of these modifications as the remaining parts are the same as previously described.

In operation, one or more of the picking elements or bars 12 are secured to a bar shaft 24 such as by set screws 17, as illustrated in Figure 2, although they may be secured thereto in other ways. The lower end of the shaft 24 is rotatably journaled in the flanges 26 at the lower end of the drum 38. Means are provided for rotating the bars. When utilizing a pulley drive the heads of the bar shafts 24 may be slightly enlarged as at 28 and have the threaded counterbores 30 by which double pulleys 32 are preferably threadedly secured to the spindle shaft 24 by means of the bolts 34. In addition, the upper flanges 36 on drums 38 receive the heads 28 and thus the bars are rotatably secured to the drums 38. While the double pulleys 32 are illustrated as being threaded to the bar shaft 24 they may be made integral therewith or secured in any suitable manner, such as by welding and the like. In addition, suitable bearings and the like may be provided, but are omitted to simplify the disclosure. Obviously, any desired means may be provided for imparting rotation to the bars. As disclosed in my previously-mentioned patents, the vertical cotton picking elements or bars 10 are carried by the drum 38 which is rotated about its axis 40 in the direction of the inclined teeth 20 and are brought into engagement with the cotton plants on the picking side of the drum 38 where they engage and remove the lint from the bolls by engaging the lint with the teeth 20 and wrapping it around the bars 10 and holding it by tension of the lint between the bars 12 and the face of the drum 38. The ridges or ribs 16 prevent green plants or sap from the plants from balling up the lint on the bars.

Then as shown in Figure 1 the picking elements or bars 10 are carried around to the delivery side of the drum where their rotation is reversed (by means not shown) tending to permit unwinding of the picked lint from the bars; although, in using the bars 12 with other pickers or cleaners it is unnecessary to reverse rotation of the bars 12 to doff the lint. The doffing assembly is mounted on the delivery side and includes a plurality of doffers 42 mounted on the shafts 43 and provided with the flexible blades 44 which engage and remove the picked lint from the bars. The doffed cotton is then collected by suitable collecting means not shown. As the spindles are carried away from the delivery side of the drums, the rotation is again reversed and the picking elements are against rotated to engage and pick lint from the bolls. Obviously, any type doffing system can be used with the bars for doffing lint from the spindles.

As previously mentioned, the bars of the present invention advantageously pick all types of cotton under varying conditions without moistening the bars, the rib construction preventing cotton from balling up or tightening up on the bars so that it can easily and readily be removed from the bars by any preferred doffing assembly, with or without reversing rotation of the bars.

It will be understood that the picking bars may be used with other types of pickers, for example, sections of the bars may be used with pickers having generally horizontally-extending pickers or bars, the tapered type being especially suitable for such use. Also, the bars may be used in cotton cleaners and the like where the cleaner is stationary.

It is noted, however, that particularly advantageous results are obtained by the combination of the spindles and a flexible doffing assembly, as described and shown, as this combination virtually eliminates balling and clogging up of the bars yet efficient picking of cotton from the bolls is obtained.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement of parts and numerous uses of the bars may be made which will readily suggest themselves to those skilled in the art which are encompassed within the spirit of the invention and the scope of the appended claims.

What is claimed is:

1. A picker bar for use in a cotton picking machine comprising, an elongate body of uniform cross-section throughout its length, said body having a plurality of circumferentially spaced and axially extending ribs on the periphery, and a plurality of axially extending rows of picker teeth, one row disposed between each pair of ribs, said teeth extending in the intended direction of rotation of the picker bar.

2. The invention of claim 1 wherein the body in cross-section is generally square.

3. The invention of claim 1 wherein said body includes a plurality of axially extending recesses, a recess disposed between each row of teeth and each adjacent rib.

4. The invention of claim 1 wherein the teeth extend radially outward from the periphery of the body as far as said ribs.

References Cited in the file of this patent

UNITED STATES PATENTS

| | | |
|---|---|---|
| 372,919 | Langley | Nov. 8, 1887 |
| 454,852 | Canuteson | Dec. 8, 1891 |
| 1,780,497 | Miller et al. | Nov. 4, 1930 |
| 2,497,777 | Baker et al. | Feb. 14, 1950 |
| 2,651,161 | Walker | Sept. 8, 1953 |

UNITED STATES PATENT OFFICE
CERTIFICATION OF CORRECTION

Patent No. 2,975,580                      March 21, 1961

Ivan P. Haring

It is hereby certified that error appears in the above numbered patent requiring correction and that the said Letters Patent should read as corrected below.

In the grant, lines 3 and 13, and in the heading to the printed specification, line 5, name of the second assignee, for "Howard T. Tellefsen", each occurrence, read -- Howard T. Tellepsen --.

Signed and sealed this 22nd day of August 1961.

(SEAL)
Attest:

ERNEST W. SWIDER                        DAVID L. LADD
Attesting Officer                          Commissioner of Patents